(12) United States Patent
Cho

(10) Patent No.: US 7,479,040 B2
(45) Date of Patent: Jan. 20, 2009

(54) BATTERY MODULE

(75) Inventor: Kyu-Woong Cho, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/434,864

(22) Filed: May 15, 2006

(65) Prior Publication Data

US 2006/0255764 A1   Nov. 16, 2006

(30) Foreign Application Priority Data

May 16, 2005   (KR) .................... 10-2005-0040587

(51) Int. Cl.
   *H01R 24/00*   (2006.01)
(52) U.S. Cl. .................................... 439/627
(58) Field of Classification Search ........... 439/627, 439/500, 566; 320/128
   See application file for complete search history.

(56) References Cited

U.S. PATENT DOCUMENTS

| | | | | |
|---|---|---|---|---|
| 983,760 A | * | 2/1911 | Patterson | ............ 429/99 |
| 5,017,441 A | * | 5/1991 | Lindner | ............ 429/9 |
| 5,886,501 A | * | 3/1999 | Marks et al. | ............ 320/112 |
| 6,628,102 B2 | * | 9/2003 | Batson | ............ 320/128 |
| 7,205,746 B2 | * | 4/2007 | Batson | ............ 320/107 |
| 2004/0137314 A1 | * | 7/2004 | Fukui | ............ 429/62 |

FOREIGN PATENT DOCUMENTS

JP         11-120976         4/1999

OTHER PUBLICATIONS

Patent Abstracts of Japan, Publication No. 11-120976; Date of Publication: Apr. 30, 1999; in the name of Tadashi Miyazaki.

\* cited by examiner

*Primary Examiner*—Neil Abrams
*Assistant Examiner*—Phuong Nguyen
(74) *Attorney, Agent, or Firm*—Christie, Parker & Hale, LLP

(57) ABSTRACT

A battery module combines a plurality of a unit cells mounted into a cap structure. The cap structure includes a circuit electrically connecting the unit cells.

16 Claims, 5 Drawing Sheets

BATTERY MODULE

CROSS-REFERENCE TO RELATED APPLICATION

This application claims priority to and the benefit of Korean Patent Application No. 10-2005-0040587 filed in the Korean Intellectual Property Office on May 16, 2005, the entire content of which is incorporated herein by reference.

BACKGROUND OF THE INVENTION

1. Field of the Invention

The present invention relates to a battery module. More particularly, the present invention relates to a battery module having an improved structure for electrically connecting a plurality of unit cells.

2. Description of the Related Art

A secondary (rechargeable) battery can be repeatedly charged and discharged unlike a primary battery.

A low-capacity rechargeable battery typically includes one unit cell and can be used for a portable small electronic device such as a mobile phone, a laptop computer and the like. On the other hand, a large-capacity rechargeable battery typically includes a plurality of unit cells and can be used as a power source for driving a motor for a hybrid electric automobile and the like.

The rechargeable battery can be fabricated in various shapes, for example, as a cylinder or a prism.

Multiple rechargeable batteries may be connected in series and thereby form a battery module with large capacity, so that the battery module can be used for driving a motor for an electric vehicle and the like.

As such, the large capacity battery module is composed of a plurality of a individual rechargeable batteries (unit cells).

A unit cell includes an electrode assembly having positive and negative electrodes and a separator interposed therebetween. A case houses the electrode assembly and a cap assembly is combined with the case and seals it.

When the unit cell is formed as a prismatic shape, the cap assembly can be mounted with positive and negative terminals, which protrude out of the cap assembly and are electrically connected with the positive and negative electrodes.

Multiple unit cells are arranged at a predetermined interval and may be connected in a series or in a parallel to form a battery module.

In general, unit cells in a battery module are electrically connected through individual conductors which are connected to positive and negative terminals of the unit cells.

The conductor is typically fixed with the positive and negative terminals by welding or by using a separate member, such as a nut.

However, since a battery module includes many unit cells, it becomes inconvenient to respectively connect all the unit cells using separate conductors.

Particularly, when the conductors are fixed with a nut, each conductor is respectively fastened with a nut. Such assembly can be burdensome and time consuming.

In addition, when some of the unit cells in a battery module have so many nuts that need to be unfastened to replace a troublesome cell, significant time and effort may be needed to maintain the battery module.

Furthermore, when the conductors are fixed by welding, it becomes difficult to replace a troublesome unit cell in a battery module.

This problem can be particularly troublesome for a high power automobile battery module such as those used by an electric vehicle or a hybrid electric automobile.

SUMMARY OF THE INVENTION

Exemplary embodiments of the present invention provide a battery module with an improved structure for electrically connecting a plurality of a unit cells more easily than the conventional art.

Exemplary embodiments of the present invention provide a battery module in which a unit cell can be easily replaced.

According to an embodiment of the present invention, a battery module is provided which includes a plurality of unit cells and a cap structure to which the unit cells are attached and which has a circuit electrically connecting the unit cells.

The battery module may be formed by mounting unit cells in the cap structure to electrically connect the unit cells.

In an embodiment one cap structure may cover at least three unit cells. Particularly, the cap structure may be designed to fasten unit cells arranged in one row or more than two rows.

The cap structure may include an attaching part for mounting the unit cells and a circuit connection part combined with the exchangeable member and electrically connecting the unit cells.

The attaching part may have an insertion groove which terminals of the unit cell are fitted into and thereby mounted.

The insertion groove may be mounted with a conductor electrically connected with the terminals of the unit cell.

On the other hand, the circuit connection part may include a conductive wire electrically connecting the conductors.

The circuit connection part may also include a protection member which will is mounted with the attaching part, covering the conductive wire. The protection member may be formed of a resin mold layer.

Based on this structure, the cap structure may fasten and fix terminals protruding out of one end of the unit cell.

The cap structure may connect the unit cells in series or in parallel.

The insertion groove may be forcibly fitted with terminals of the unit cells.

According to another embodiment of the present invention, a cap structure may include an attaching part having an insertion groove which is fitted with terminals of the unit cell, and another fastening groove which is fastened with a part of a case adjacent to the terminals.

The insertion groove or fastening groove may be mounted with the aforementioned conductor.

DETAILED DESCRIPTION

Figure 1:
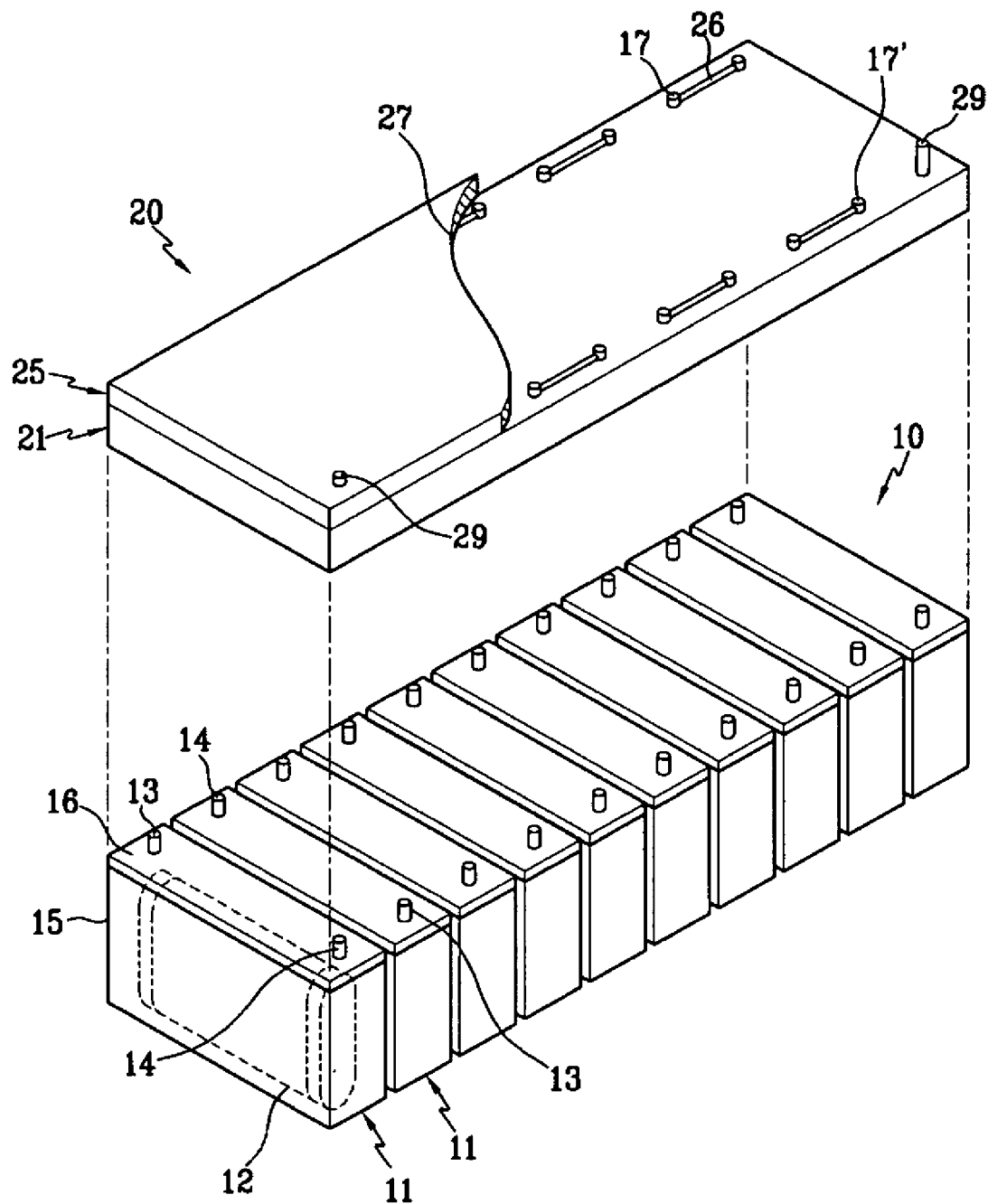
FIG. 1 is a perspective view illustrating a battery module according to a first embodiment of the present invention.
Figure 2:
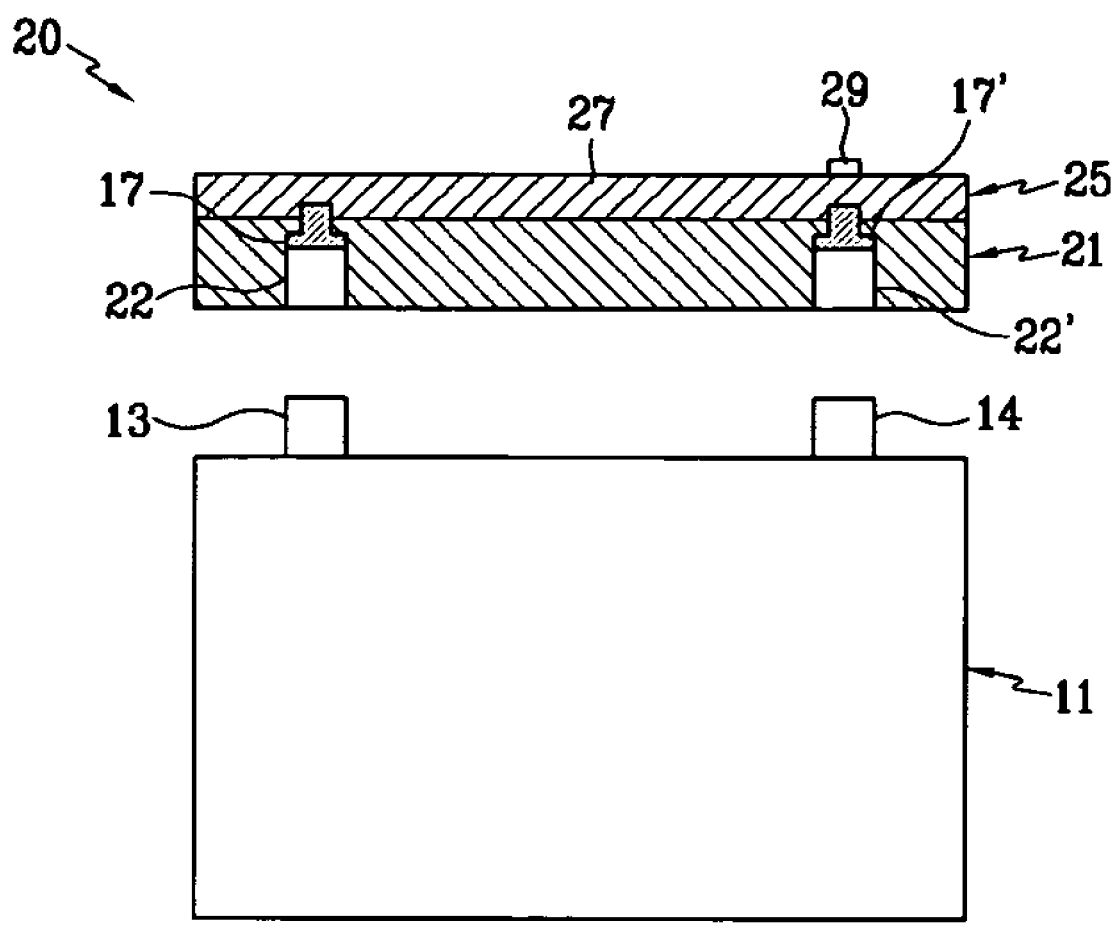
FIG. 2 is a schematic cross sectional view illustrating a structure of fastening unit cells in a battery module according to the first embodiment of the present invention.

Referring to FIGS. 1 and 2, a battery module 10 includes a plurality of a unit cells 11 and a cap structure 20 having a circuit for electrically connecting the unit cells 11. Cap structure 20 is designed to be able to fasten and unfasten the unit cells 11.

Each unit cell 11 includes a case 15 for housing an electrode assembly 12 and a cap plate 16 mounted on the case 15. The electrode assembly 12 includes positive and negative electrodes, a separator interposed therebetween and positive and negative terminals 13, 14 electrically connected with the negative and positive electrodes.

The positive and negative terminals 13, 14 of each unit cell 11 are electrically connected to the cap structure 20, the cap structure having a circuit for electrically connecting the unit cells.

According to the depicted embodiment, each unit cell 11 is prismatic and has positive and negative terminals 13, 14 protruding out of its cap plate 16. A plurality of the unit cells 11 may be combined in series or in parallel using the cap structure 20 so as to be electrically connected together without having to use separate connections as in the prior art.

The cap structure 20 includes an attaching part 21 having insertion grooves 22, 22' to fit with positive and negative terminals 13, 14. Cap structure 20 also includes circuit connection part 25 which is combined with the attaching part 21 to electrically connect the positive and negative terminals 13, 14.

The circuit connection part 25 has conductive wires 26 mounted according to a circuit pattern designed for electrical connection of the unit cells. The conductive wires 26 are connected to insertion grooves 22, 22' which have internally mounted conductors 17, 17' which contact positive and negative terminals 13, 14.

As shown in FIG. 1, the attaching part 21 has a width and length corresponding to the entire size of an assembly of unit cells 11. The attaching part 21 is combined with unit cells 11, covering one side (the side where terminals are arranged) of the assembly of unit cells 11.

According to the embodiment of the present invention, positive and negative terminals 13, 14 are forcibly fitted into insertion grooves 22, 22' and thereby, contact conductors 17, 17' mounted in the insertion grooves 22, 22', to provide electrical connection to circuit connection part 25.

Unit cells 11 may be electrically connected to circuit connection part 25 in other different ways. However, in one embodiment attaching part 21 is detachable, when coupled with unit cells 11, and thereby, the unit cells 11 may be re-moveably electrically connected to a circuit connection part 25.

In an exemplary embodiment, the positive and negative terminals may have a recess portion so that it may be combined with a convex portion disposed in insertion grooves of an attaching part. The convex portion would be applied with elastic force to facilitate the combination with the recess portion.

Conductive wires 26 are formed in a predetermined pattern on or in the circuit connection part 25 and are connected to conductors 17, 17' disposed in insertion grooves 22, 22' of an attaching part.

The conductors 17, 17' are mounted to protrude out of the top of an attaching part 21 and may be fixed with a conductive wire 26 by welding to form a circuit.

Unit cells 11 may be connected in series through conductors 17, 17' mounted inside a cap structure 20 and using a conductive wire 26 which electrically connects positive and negative terminals of neighboring unit cells.

Conductors 29 are coupled to the end positive and negative terminals and externally protrude out of the cap structure 20 such that conductors 29 form respective external terminals of the battery module 10.

The conductive wires 26 may be covered by a protection member 27 mounted in a circuit connection part 25. The protection member 27 may be formed of a resin mold layer.

Figure 3:
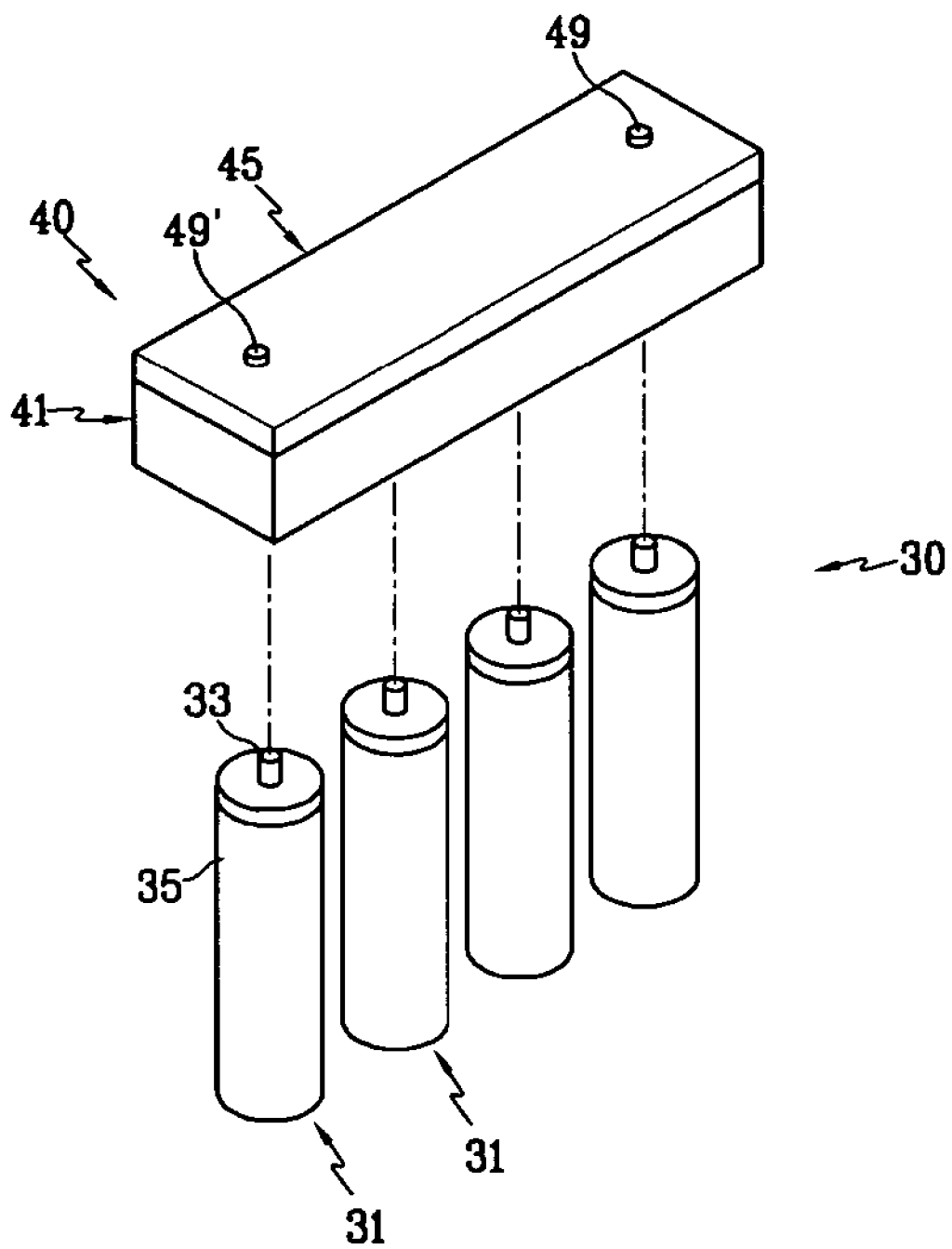
FIG. 3 is a perspective view illustrating a battery module according to a second embodiment of the present invention.
Figure 4:
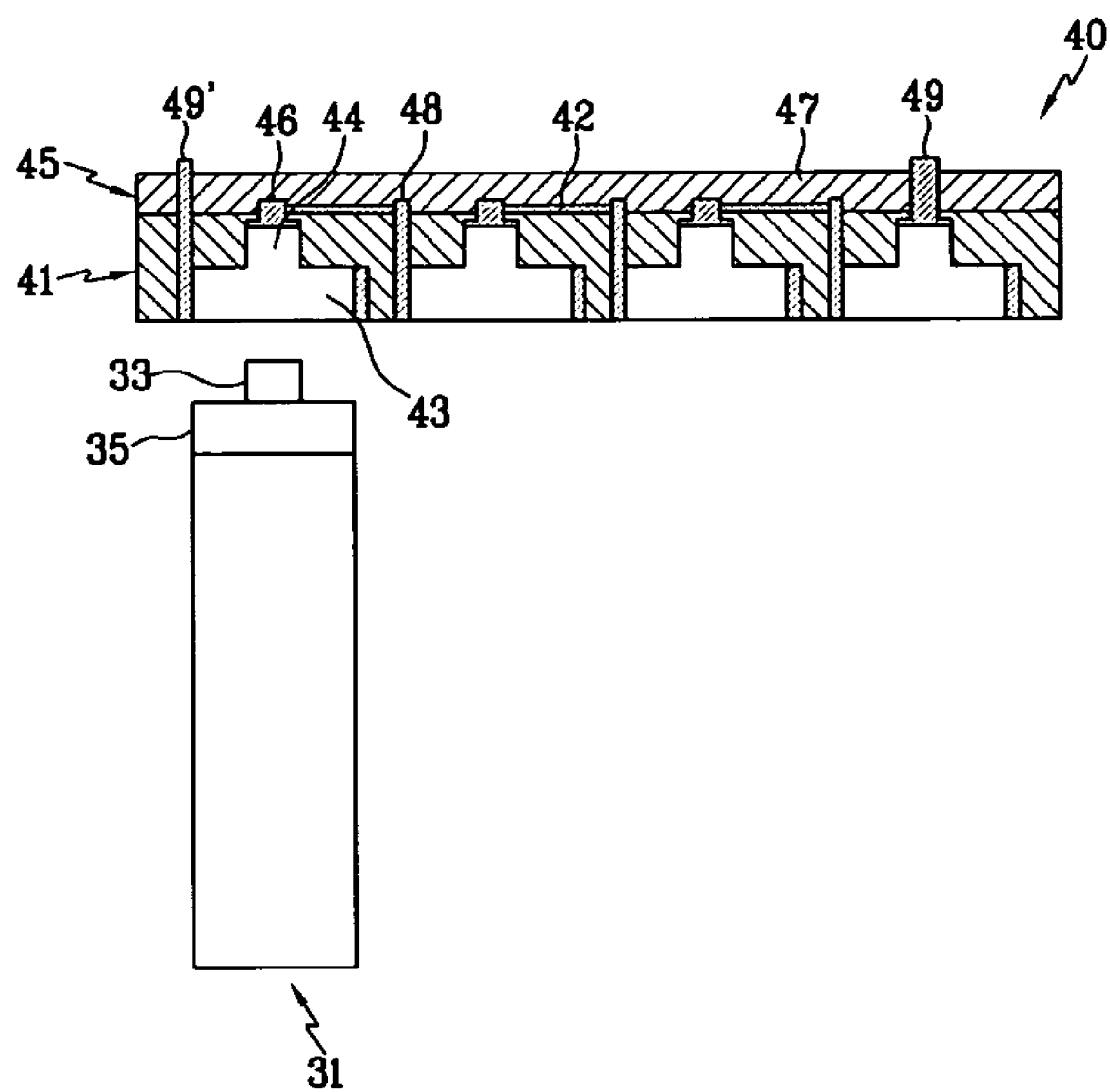
FIG. 4 is a schematic cross sectional view illustrating a structure of fastening unit cells in a battery module according to the second embodiment of the present invention.

FIGS. 3 and 4 show a battery module having cylindrical unit cells according to a second embodiment of the present invention. Battery module 30 includes a plurality of cylindrical unit cells 31 and a cap structure 40 having a circuit to connect the unit cells 31 and be capable of attaching and detaching the unit cells 31.

The unit cells 31 include a positive terminal 33 protruding out of one end of a case 35, with the case 35 playing the role of a negative terminal.

The cap structure 40 includes an attaching part 41 having a fastening groove 43 into which a case 35 is fitted, and a circuit connection part 45 combined with the attaching part 41 for electrically connecting a terminal 33 and the case 35.

The fastening groove 43 has an insertion groove 44 which is fitted with the terminal 33 of the unit cell 31, and both the fastening groove 43 and the insertion groove 44 are mounted with conductors 46, 48, which contact a case 35 and a terminal 33 of each unit cell.

Both the fastening groove 43 and the insertion groove 44 may have a smaller internal diameter than the external diameter of a case 35 or a terminal 33. In this case, the case 35 and the positive terminal 33 are forcibly (press) fitted in the fastening groove 43 and insertion groove 44.

On the other hand, the fastening grooves 43 may have a convex portion while a case 35 may have a recess portion (not shown), so that they may be fitted with each other. The convex portion may be applied with an elastic force to facilitate its combination with the recess portion.

The circuit connection part 45 has conductive wires 42 patterned according to a circuit designed for electrically connecting unit cells 31.

The conductive wire 42 may be mounted inside the circuit connection part 45 in a predetermined pattern and contacts conductors 46, 48 disposed in fastening and insertion grooves 43, 44.

The conductors 46, 48 protrude out of top of the attaching part 41, and the protruding part of the conductors 46, 48 may be fixed with the conductive wire 42 by welding, forming a circuit.

In addition, the circuit connection part 45 may include a protection member 47 covering the conductive wire 42. The protection member 47 may be formed of a resin mold layer to safely protect the conductive wires 42. The protection member 47 covers the conductive wires 42 to prevent the wires from being destroyed and cut when it is externally exposed.

When a unit cell 31 fits with a fasten-unfasten part 41 of a cap structure, the negative terminal case 35 fits with a fastening groove 43 and is connected to a conductive wire 42 through a conductor 48. A positive terminal 33 fits with an insertion groove 44 and is connected to the conductive wire 42 through a conductor 46.

Conductors 49, 49' are connected to the end positive and negative terminals and protrude out of top of a cap structure 40 and form respective external terminals of the battery module 30.

Figure 5:
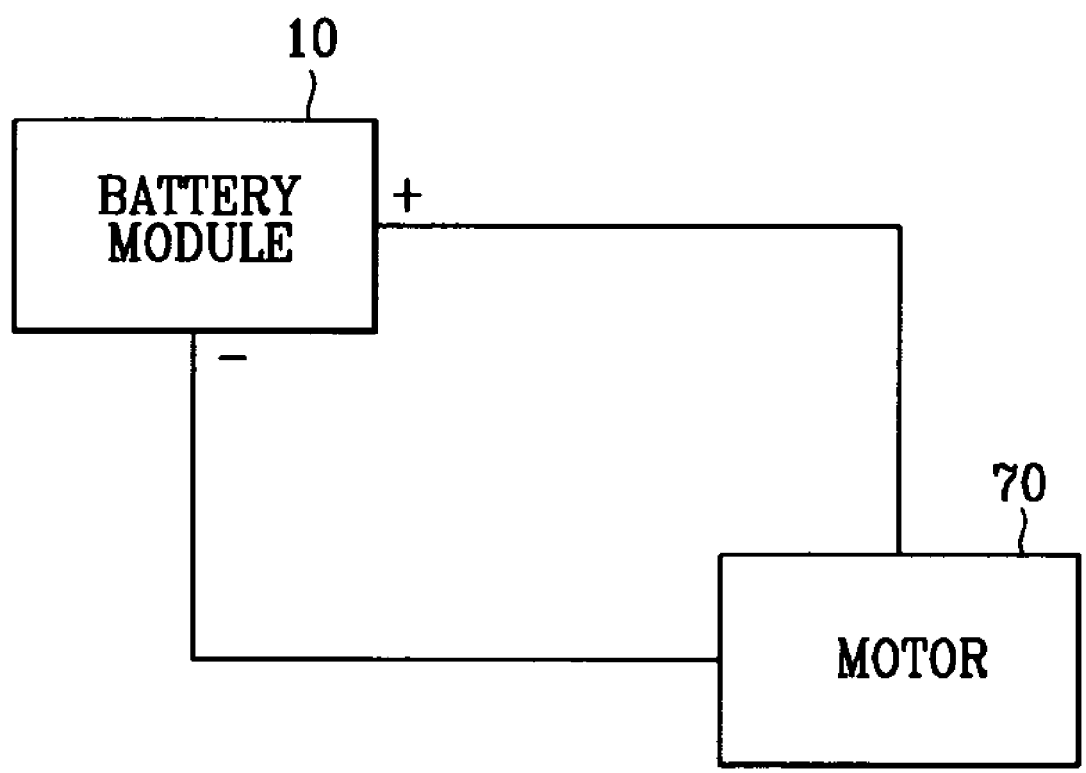
FIG. 5 is a block diagram schematically illustrating a battery module as a power source for driving a motor.

FIG. 5 is a block diagram schematically showing a state in which the battery module 10 shown in FIG. 1 is connected to a motor 70.

According to the depicted embodiments of the present invention, a battery module is formed of unit cells electrically connected in series through a circuit connection part which connects a case of a unit cell with a terminal of another neighboring unit cell. However, the present invention is not limited to these exemplary embodiments. Therefore, unit cells may be connected in parallel.

A battery module of the present invention may be used as a power source for driving a motor for a hybrid electric automobile (HEV), an electric vehicle (EV), a cordless cleaner, a motorbike, an electric scooter and the like.

According to the embodiments of the present invention, a cap structure can contribute to decreasing the time and effort in replacing a unit cell, since it can be easily fastened and unfastened.

In addition, a cap structure of the present invention can electrically connect unit cells without a separate individual connection process and thereby make the battery connection process quick and simple.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module comprising:
    a plurality of unit cells having terminals; and
    a cap structure comprising a first substrate, a second substrate on the first substrate, and a plurality of electrically conductive wires between the first substrate and the second substrate, the plurality of electrically conductive wires electrically coupling the plurality of unit cells together in series or in parallel, each of the plurality of electrically conductive wires electrically coupling one of the terminals of one of the unit cells with one of the terminals of a neighboring one of the unit cell.

2. The battery module of claim 1, wherein the cap structure connects each unit cell in series.

3. The battery module of claim 1, wherein the battery module provides power to a motor.

4. The battery module of claim 1, wherein the cap structure comprises an attaching part having insertion grooves coupleable with the terminals of the unit cells and fastening grooves coupleable with cases of the unit cells, the attaching part being the first substrate.

5. The battery module of claim 4, wherein the insertion grooves and the fastening grooves are mounted with conductors electrically connected to the terminals and the cases.

6. The battery module of claim 5, wherein the cap structure comprises a circuit connection part coupleable with the attaching part and mounted with the plurality of electrically conductive wires connecting the conductors, the circuit connection part being the second substrate.

7. The battery module of claim 6, wherein the circuit connection part includes a protection member covering the plurality of electrically conductive wires.

8. The battery module of claim 7, wherein the protection member is formed of a resin mold layer.

9. The battery module of claim 1, wherein the cap structure comprises an attaching part for mounting the unit cells and a circuit connection part coupled with the attaching part, the attaching part being the first substrate and the circuit connection part being the second substrate, the plurality of electrically conductive wires electrically connecting the unit cells being located in or on the circuit connection part.

10. The battery module of claim 9, wherein the attaching part has insertion grooves coupleable with terminals of the unit cells.

11. The battery module of claim 10, wherein the insertion grooves are adapted to be forcibly fitted with respective terminals of the unit cells.

12. The battery module of claim 10, wherein the insertion grooves are mounted with conductors electrically connected with the terminals of the unit cells.

13. The battery module of claim 12, wherein the circuit connection part includes the plurality of electrically conductive wires connecting the conductors.

14. The battery module of claim 13, wherein the circuit connection part includes a protection member covering the plurality of electrically conductive wires.

15. The battery module of claim 14, wherein the protection member is formed of a resin mold layer.

16. A battery module comprising:
    a plurality of unit cells having terminals;
    a cap structure having a first cap structure substrate and a second cap structure substrate on the first cap structure substrate, the second cap structure substrate having a bottom surface coupled to a top surface of the first cap structure substrate, the first cap structure substrate being configured to cover the plurality of unit cells and having a plurality of insertion grooves coupleable with the terminals, the plurality of insertion grooves being configured to allow the terminals to be inserted in the insertion grooves;
    a plurality of conductors mounted in the plurality of insertion grooves, the plurality of conductors extending through the top surface of the first cap structure substrate and being configured to contact the terminals inserted in the insertion grooves; and
    a circuit electrically connecting adjacent conductors coupled to the terminals of the plurality of unit cells, the circuit being on the top surface of the first cap structure substrate and the bottom surface of the second cap structure substrate, the circuit having a plurality of conductive wires attached to the conductors,
    wherein the plurality of unit cells are mounted to the cap structure.

* * * * *

UNITED STATES PATENT AND TRADEMARK OFFICE
CERTIFICATE OF CORRECTION

| | | |
|---|---|---|
| PATENT NO. | : 7,479,040 B2 | Page 1 of 1 |
| APPLICATION NO. | : 11/434864 | |
| DATED | : January 20, 2009 | |
| INVENTOR(S) | : Cho | |

It is certified that error appears in the above-identified patent and that said Letters Patent is hereby corrected as shown below:

On the Title Page

(57) Abstract, line 1                               Delete "a".

In the Claims

Column 5, line 38, Claim 1                          Delete "cell" and insert -- cells --.

Signed and Sealed this

Sixteenth Day of February, 2010

David J. Kappos
*Director of the United States Patent and Trademark Office*